United States Patent [19]

Boleda et al.

[11] 4,450,556

[45] May 22, 1984

[54] DIGITAL SIGNAL SUBSCRIBER LOOP AND INTERFACE CIRCUIT

[75] Inventors: Alberto Boleda, Menlo Park, Calif.; Terence N. Thomas, Ontario, Canada

[73] Assignee: Northern Telecom Limited, Montreal, Canada

[21] Appl. No.: 197,939

[22] Filed: Oct. 17, 1980

[51] Int. Cl.³ .............................................. H04J 3/00
[52] U.S. Cl. ...................................... 370/58; 370/61; 370/24
[58] Field of Search .................... 370/58, 61, 100, 53, 370/24

[56] References Cited

U.S. PATENT DOCUMENTS

| | | | |
|---|---|---|---|
| 3,935,391 | 1/1976 | Weir et al. | 370/61 |
| 3,987,250 | 10/1976 | Barbier et al. | 370/100 |
| 4,079,188 | 3/1978 | Kinch, Jr. et al. | 370/24 |
| 4,107,468 | 8/1978 | Gauriat et al. | 370/100 |
| 4,119,803 | 10/1978 | Jacob | 370/58 |
| 4,201,893 | 5/1980 | McLaughlin | 370/58 |
| 4,305,148 | 12/1981 | Deglin | 370/58 |
| 4,312,063 | 1/1982 | Warner | 370/61 |

FOREIGN PATENT DOCUMENTS 1555394 11/1979 United Kingdom .

OTHER PUBLICATIONS

*A Digital Subscriber Set*, Meyer et al.; IEEE Trans. on Communications, vol. Com-27, #7, 7/79.
1980 IEEE International Solid-State Circuits Conference, A. Boleda et al., "A Monolithic Digital Line Interface Circuit", pp. 176-177.
International Conference on Communications (1980), P. K. Desikan et al., "A Data Switching Technique for a Digital PABX", vol. 2, pp. 19.5.1-19.5.5.
1978 International Zurich Seminar on Digital Communications, J. H. Giddy, "Characteristics and Performance of Two Wire . . . ", pp. H3.1-H3.4.
Telecom Report, R. Lueder, "Kommunikationsdienste und Teilnehmertechnik im dienstintegrierten Digitalnetz", vol. 3, No. 3, pp. 222-227.
International Switching Symposium, R. Montemurro et al., "Realisation d'un Equipement Terminal Numerique . . . ", pp. 926-933, (1979).
1978 International Zurich Seminar on Digital Communications, P. Hirschmann et al., "Design Concept and Features . . . ", pp. D1.1-D1.4.

Primary Examiner—Marshall M. Curtis
Attorney, Agent, or Firm—Schwartz, Jeffery, Schwaab, Mack, Blumenthal & Koch

[57] ABSTRACT

A TDM PCM telephone system and a telephone user terminal are interconnected by a digital subscriber loop circuit which provides at least a single channel communication path for digital signals of data or encoded voice origin. The digital subscriber loop circuit includes transmit and receive paths and a line interface circuit. The line interface circuit converts a selected channel of binary signals appearing at a subscriber line port of the telephone system into a corresponding bipolar return to zero (BPRZ) signals for transmission on the receive signal path. The line interface circuit also converts BPRZ signals from the transmit signal path to corresponding binary signals. These binary signals are accumulated and stored. At a time coincident with the selected channel occurrence, the line interface circuit transmits the stored signals to the subscriber line port for acceptance by the telephone system. In one arrangement, the digital subscriber loop is interfaced at opposite ends by a universal line interface circuit (ULIC) which provides for compatible use with two TDM signal formats and with any one of a plurality of commercially available single channel codecs in the associated telephone user terminal.

5 Claims, 6 Drawing Figures

DIGITAL SIGNAL SUBSCRIBER LOOP AND INTERFACE CIRCUIT

The invention relates to telephone systems and more particularly to interface circuitry and a digital subscriber loop for connecting an associated communication terminal apparatus to a digital telephone switching system.

Telephony communications have historically been provided by analog voice band signals, transmitted between communicating parties. Audible signals having frequencies in a range of between about 200 Hz and 3.8 KHz are converted to electrical analog voice band signals in a telephone station set. The analog signals traverse the distance between telephone station sets of communicating parties through a telephone network, which is characterized by a switching facility and subscriber loops connecting the telephone station sets to the switching facility. The signals received by a distant telephone station set are reproduced as audible signals. Over the years the telephone network has expanded to include numerous switching facilities such as central offices (CO) for serving the communication requirements of the general public, and private branch exchanges (PBX), for serving business or specialized organizations.

The telephone network is also used to transfer data information between various machine apparatus. However, the rate at which machine apparatus can efficiently transmit and receive data information signals is restricted by the voice band limitations of the subscriber loop. Data signals for transmission over the subscriber loop are converted in a modulator/demodulator (MODEM) circuit into a corresponding frequency domain signal format compatible with the voice band operating characteristics of the telephone network. In one example, the well known frequency shift keying format (FSK), one voice band frequency signal corresponds to one of two binary data signal states and a distinctly different voice band frequency signal corresponds to the other binary data signal state. The data information signals are transmitted through the telephone network to a distant MODEM which converts the signals back to the original binary data signal format. Various examples of FSK systems are currently in use and typically provide for data information bit transmission rates of between 300 and 1,200 bits per second or baud. In cases where higher speed data transmission is necessary, special wide band transmission facilities are provided separate and distinct from the voice band telephone network.

Recently, digital switches, as distinct from analog switches have become commercially available for use in CO and PBX applications. In one form of the digital switch, communication paths through the switch provide for transmission of binary signals in a time division multiplex (TDM) pulse code modulated (PCM) signal format.

TDM PCM systems, for example systems known as SL1 and DMS 10, are manufactured by Northern Telecom Limited, P.O. Box 6123, Montreal, Quebec, Canada. In these systems, four-wire PCM multiplex loops connect a switching network with local peripheral equipment. Each four-wire PCM multiplex loop has a capacity for carrying 32 multiplexed channels of binary signals with a frame repetition frequency of 8 KHz. The length of the PCM loop is restricted to a distance of not more than 50 feet in order to avoid significant delay in the transmission of signals between the switching network and the local peripheral equipment. The peripheral equipment interfaces the binary digital signal format of the network with the voice band analog signal operating requirements of the associated subscriber telephone station sets and subscriber loops. The peripheral equipment includes single channel codecs interfaced with a multiplex loop each via a subscriber line port consisting of digital input/output circuits. Each codec is also interfaced with an associated two-wire subscriber loop via an analog line circuit including a 2W–4W hybrid network. The line circuit includes circuitry for supplying the subscriber loop with energizing current and ringing signals in addition to supervisory circuitry for recognizing supervisory states for example, ON HOOK, OFF HOOK and dial pulse conditions. Voice PCM encoded signals from the switching network are transferred at the subscriber line port from two wires of the multiplex loop to the codec, under the control of the switching facility. The codec also receives timing signals for its operation. The codec generates an analog signal corresponding to the received PCM signals. The analog signal is transmitted to the telephone station set via the analog line circuit and the subscriber loop. In the telephone station set the signals are received via another 2W–4W hybrid circuit and thereby directed to a receiver which produces a corresponding audible signal. An audible signal from the user is converted by a transmitter in the telephone station set to a voice band electrical signal for transmission to a distant telephone station set. This signal is transmitted via the previously mentioned hybrid circuits and the subscriber loop to the codec. The codec encodes the transmitted analog signal into the PCM signals which are coupled at the subscriber line port to the other two wires of the multiplex loop via the digital input/output circuitry for transmission through the switching network. It should be noted that looking from the 2W–4W hybrid circuit in the analog loop circuit toward the telephone station set, there is no distinction between the TDM PCM switching office arrangement and the typical subscriber loop well known in association with analog telephone switching facilities.

Single channel codecs for use in the peripheral equipment are available in the form of various integrated circuits. Some present examples of integrated circuit codecs are QMV59 and QMV64 manufactured by Northern Telecom Limited or subsidiaries thereof, DF331 and DF332 manufactured by Silliconix Inc., 2201 Laurelwood Rd., Santa Clara, Calif. 95054, U.S.A., and 2911 manufactured by Intel Corp., 3065 Bowers Avenue, Santa Clara, Calif. 95051, U.S.A.

Summary of the Invention

It is an object of the invention to provide a digital signal interface and transmission circuit for connecting a TDM PCM telephone system with a remotely located telephone user terminal.

In accordance with the invention, a digital subscriber loop circuit is inserted at an interface between a subscriber port in a digital telephone facility and a single channel codec associated with a remote telephone user terminal. The single channel codec is place in the telephone user terminal. Line interface circuits provide signal interface functions between the subscriber port and a digital signal path extending toward the remote telephone user terminal, and between the remotely located single channel codec and the digital signal path.

In the previously mentioned SL1 system, there is optional provision for bidirectional binary data signal transmission over an additional pair of data leads in the subscriber loop. An example of this arrangement is described in U.S. Pat. No. 3,936,602 entitled "Full Duplex Data Transmission Systems Using Two Speeds of Diphase Signal for Simplified Sync." and issued on Feb. 3, 1976 to Klaas Korver. The data information is transmitted effectively at about 1200 baud and pertains solely to telephone supervisory and signalling functions. Similar to the analog voice signal situation, the binary data information signals are transmitted and received through transformer hybrid circuits. If it is intended that data be transmitted to a remote telephone user terminal via the SL1 system, such is accomplished in a conventional manner over the voice signal pair of leads in the subscriber loop, as for example by means of the FSK signal format. In a telephone system having a digital switching network operable in a TDM binary PCM signal format, there is no distinction as to the origin of the binary signals in the network as to whether the signals represent data signals or encoded analog signals. The maximum rate at which data information can be accommodated in a TDM channel is directly dependent upon the average bit occurrence frequency of the channel. Each channel in the TDM format has an average binary bit occurrence frequency determined by the number of bits per PCM word multiplied by the frame repetition frequency. A frame repetition frequency of 8 KHz with 8 bits per word is typical and yields an average bit occurrence frequency of 64 Kb/s per channel. Each channel occurrence occupies a time of 1/n channels in each frame period. In a 24 channel system this results in a peak channel bit rate of more than 1.5 Mb/s, and in a 32 channel system the peak channel bit rate is more than 2 Mb/s. Although the switching network in a digital switching facility such as the SL1, is capable of passing data between subscriber ports at up to 64 Kb/s, the maximum rate of data transmission through the telephone system as a whole is limited by the operating characteristics of the associated subscriber loops.

It is also an object of the invention to provide an operationally transparent digital signal interface and transmission circuit for coupling signals of both voice and data origin between a remotely located telephone user terminal and a TDM PCM telephone system.

In accordance with the invention, digital signal subscriber loops are provided in association with a TDM telephone system and respective digital signal telephone user terminals. Digital signals of voice or data origin are thereby transmittable between telephone user terminals at the average channel bit rate of the operating signal format in the TDM telephone system. Each digital subscriber loop includes separate transmit and receive paths, coupled between a subscriber port of the TDM telephone system and a respective telephone user terminal. Binary signals in an assigned channel are routed between selected subscriber ports by the TDM telephone system. The signals routed to a subscriber port are coupled to the digital signal subscriber loop through a line interface unit. The line interface unit store the signals received from the subscriber port and then later transmits corresponding signals with appropriate timing over the receive signal path for use by the remotely connected telephone user terminal. The signals are transmitted by the line interface unit at a bit rate which is substantially less than the bit rate of the operating format of the TDM telephone system. Signals from the telephone user terminal are transmitted over the transmit signal path for coupling to the subscriber port. The signals from the transmit signal path are received by the line interface unit and accumulated in storage. At an appropriate time, indicated to the line interface unit by the TDM telephone system, corresponding binary signals are transmitted by the line interface unit to the subscriber port for acceptance by the TDM telephone system.

Also in accordance with the invention a single channel codec resident in the telephone user terminal is of a type consistent with usage in peripheral equipment of a TDM PCM telephone system. A digital subscriber loop circuit, including transmit and receive paths, couples the telephone user terminal with a subscriber port of the TDM PCM telephone system. The transmit and receive paths are interfaced with the subscriber port and with the codec in the telephone user terminal by a pair of universal line interface circuits (ULIC). One ULIC is connected between the subscriber port and the transmit and receive paths to simulate the circuit response of the single channel codec. The other ULIC is connected between the codec and the transmit and receive paths to simulate the signal characteristics of the subscriber line port. The line interface units each exchange information bits with the transmit and receive paths at a maximum bit rate corresponding to twice the average bit rate of a single channel in the TDM PCM telephone system, and exchange information bits at the telephone system or at the telephone user terminal at the operating bit rate of the TDM telephone system.

In the case where signals in a bipolar return to zero (BPRZ) signal format are used to transmit information bits between the line interface circuits, twisted pair conductors similar to those typically used for analog subscriber loops are satisfactory for providing the transmit and receive paths.

BRIEF DESCRIPTION OF THE DRAWINGS

An example embodiment of the invention will now be described with reference to the accompanying drawings in which.

DETAIL DESCRIPTION OF THE PREFERRED EMBODIMENTS

The structure and operation of the digital subscriber loop circuit will become apparent in the following functional description of the drawings.

Figure 1A:
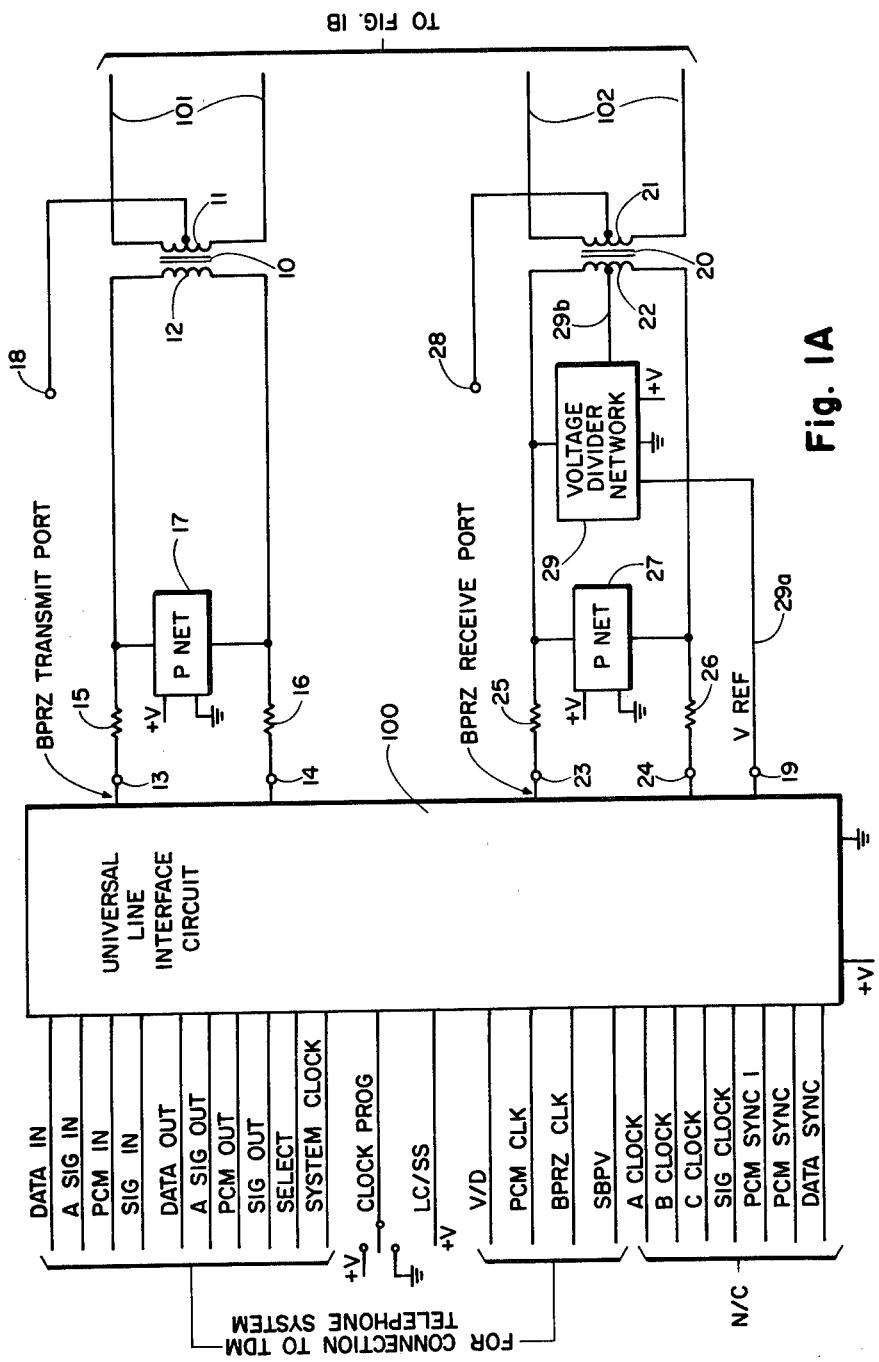
FIG. 1A is an illustration of a portion of a digital subscriber loop circuit for use adjacent a TDM PCM telephone switching facility.
Figure 1B:
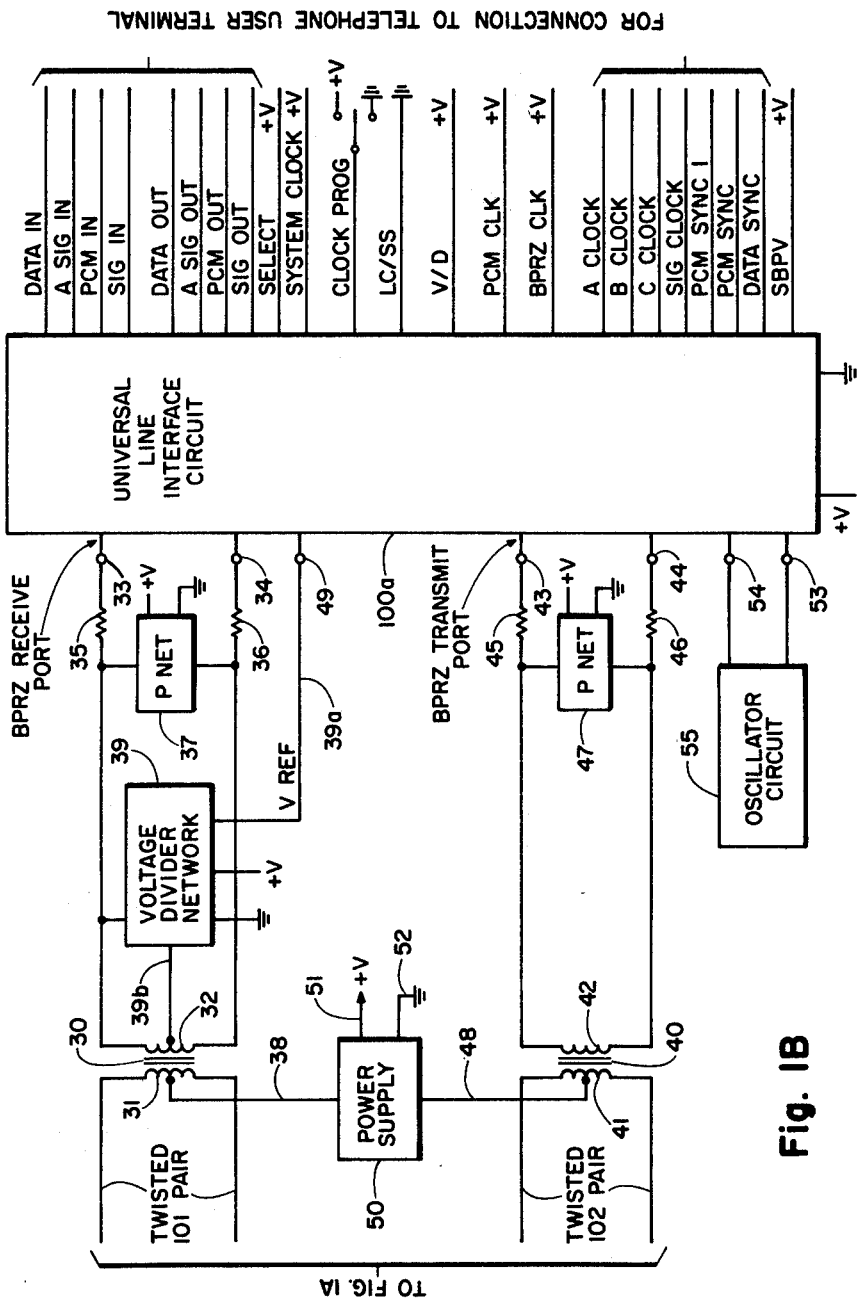
FIG. 1B is an illustration of a portion of the digital subscriber loop circuit for use adjacent a user terminal, for example a digital telephone set.

Referring to FIGS. 1A and 1B, a receive path includes coupling transformers 10 and 30 and a transmit path includes coupling transformers 20 and 40. Information signals are transmitted over the receive and transmit paths in bipolar return to zero (BPRZ) signal format. Energizing direct current is supplied from battery terminals 18 and 28 in FIG. 1A for operation of a power supply circuit 50 in FIG. 1B. Current associated with the battery terminal 18 is conducted in one direction through a centertapped winding 11 in the transformer 10, along a twisted pair of leads 101 in the receive path, and through a centertapped winding 31 of the transformer 30 to feed the power supply circuit 50. Current associated with the battery terminal 28 is conducted in the other direction through a centertapped winding 21 of the transformer 20, along a twisted pair of leads 102 in the transmit path, by way of a centertapped winding 41 of the transformer 40 and the power supply circuit 50.

Figure 5:
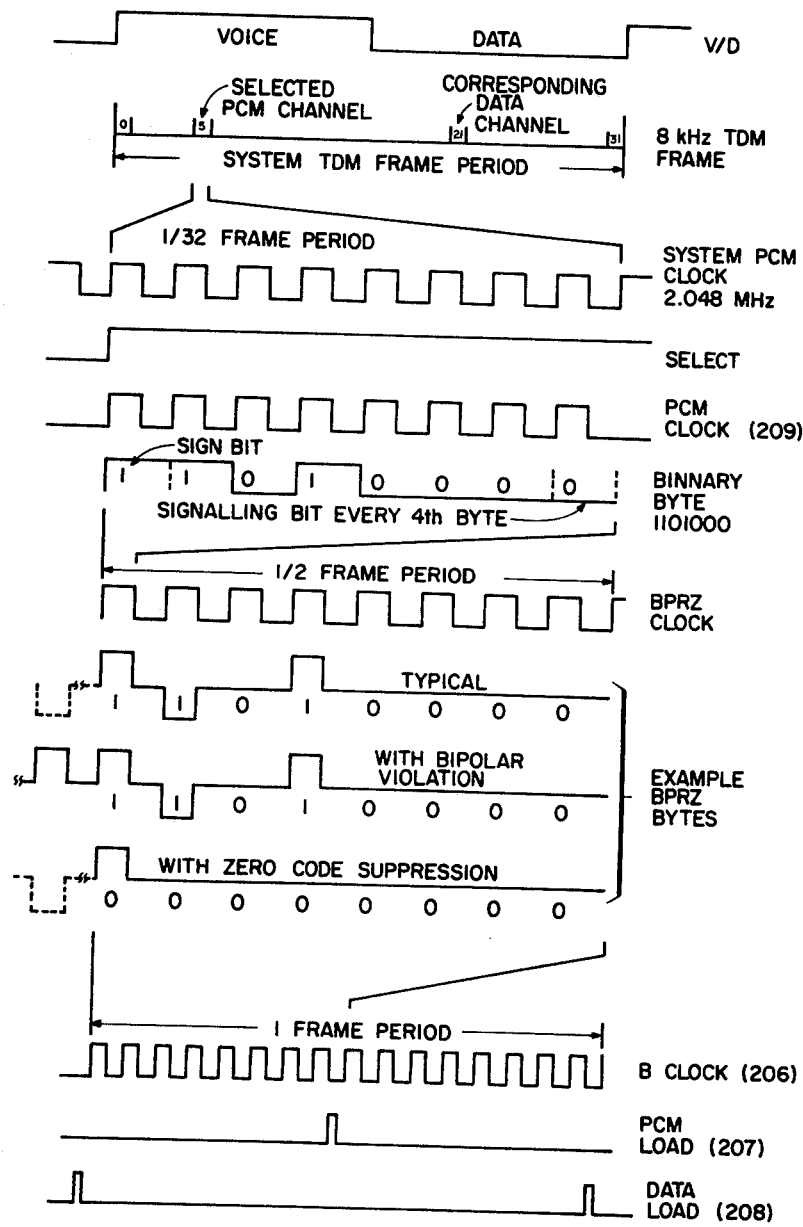
FIG. 5 is an illustration of some typical waveforms which occur during operation of the digital subscriber loop circuit in the preceding figures.

BPRZ signals are generated by a universal line interface circuit (ULIC) 100 in FIG. 1A and appear at a BPRZ transmit port consisting of terminals 13 and 14. An example of a binary byte 11010000 and corresponding BPRZ bytes are illustrated in FIG. 5. The BPRZ signals are coupled to the leads 101 via resistors 15 and 16, and windings 12 and 11 in the transformer 10. A protection network 17 is connected across the winding 12. BPRZ signals are received by the ULIC 100 at a BPRZ receive port consisting of terminals 23 and 24. The BPRZ signals are coupled from the twisted pair 102 via centertapped windings 21 and 22 in the transformer 20 and resistors 25 and 26. A protection network 27 is connected across the winding 22. A voltage divider network 29 includes ground and +V terminals, an output lead 29b connected to the centertap of the winding 22, and a reference lead 29a connected to provide a voltage reference at a terminal 19 of the ULIC 100. The voltage reference provides a threshold level which is used in detecting the BPRZ signals received in the ULIC 100.

In FIG. 1B BPRZ signals are received and transmitted by a ULIC 100a of structure identical to that of the ULIC 100 in FIG. 1A. BPRZ signals are received from the leads 101 by BPRZ receive port terminals 33 and 34. The BPRZ signals are received via centertapped windings 31 and 32 of the transformer 30, and resistors 35 and 36. A voltage divider network 39 includes ground and +V terminals, an output lead 39b connected to the centertap of the winding 32 and a reference lead 39a connected to provide a voltage reference at the terminal 49 of the ULIC 100a. A protection network 37 is connected across the winding 32. BPRZ signals are transmitted from the BPRZ transmit port terminals 43 and 44 of the ULIC 100a. The BPRZ signals are transmitted via resistors 45 and 46 and windings 41 and 42 of the transformer 40. A protection network 47 is connected across the winding 42.

It is envisaged that the ULIC is most economically produced in volume as a monolithic integrated circuit. Protection against transmission line induced voltage transients at the transmit port terminals 13 and 14, and 43 and 44 is afforded by diode networks providing the respective protection networks 17 and 47 in combination with the resistors 15 and 16 and the resistors 45 and 46, each having a value of about 120 ohms. Similar protection at the receive port terminals 23 and 24, and 33 and 34 is afforded by the respective protection networks 27 and 37 in combination with the resistors 25 and 26 and the resistors 35 and 36 each having a value of about 10K ohms.

BPRZ signals for transmission are developed from binary signals supplied either from a subscriber port of a TDM telephone system (not shown) or from codec and data circuits in a telephone user terminal (not shown). The binary signals are applied at up to four different inputs of the ULICs as follows. Binary data signals in eight bit bytes of one byte per frame, can be received via a DATA IN lead. An auxilliary signalling data bit can be received on an A SIG IN lead and periodically substituted in the ULIC for one of the bits of a byte of the received binary data signals. Pulse code modulated (PCM) binary signals in eight bit bytes of one byte per frame, may be received via a PCM IN lead. A signalling data bit can be received on a SIG IN lead and periodically substituted in the ULIC for one of the bits of a byte of the received PCM binary signal bits.

Binary output signals for receipt either by the subscriber port of the TDM telephone system or by the telephone user terminal are developed from BPRZ signals appearing at the BPRZ receive ports of the ULICs. These binary signals may appear on up to four output leads DATA OUT, A SIG OUT, PCM OUT, and SIG OUT. These signals are of the same format and function as their corresponding counterparts appearing on the above-mentioned and corresponding IN leads.

The ULIC 100 in FIG. 1A requires various control an timing signals for its operation. These signals are normally generated in the TDM telephone system and are available at the associated subscriber port for the operation of a typical subscriber line circuit including a single channel codec. Input ports or terminals labelled PCM CLK and SYSTEM CLK receive input timing signals. The PCM CLK terminal of the ULIC requires a system first clock signal defining the bit rate of the operating format of the TDM telephone system, typically around 2 MHz. An example of a 2.048 MHz PCM clock waveform occurring during a channel five period in an eight KHz TDM frame is illustrated in FIG. 5. The SYSTEM CLK terminal of the ULIC requires a input signal defining a rate twice that of the signal at the PCM CLK terminal. A SELECT input port or terminal of the ULIC requires an input signal assertion, for example as shown in FIG. 5, coincident with the occurrence of a data or PCM signal intended for receipt on the DATA IN lead or on the PCM IN lead as the case may be. A frame input signal corresponding to the signalling frame occurrence rate in the telephone facility is required at a SBPV lead of the ULIC. The frame input signal is useful in generating appropriate bipolar violation in the BPRZ signal format for transmitting frame timing. In addition, in order to identify the sources of binary signals (i.e. data or PCM) for receipt by the ULIC at any one instant in time, a voice/data input signal is required at a V/D lead of the ULIC. If two channels of information signals are to be transmitted from the TDM telephone system to the transmission line, the voice/data signal will have a period corresponding to the frame period such that channels occurring in one-half of the frame are designated as being for voice PCM and corresponding channels in the other half of the frame are designated as being for data. A typical voice/data signal waveform is illustrated at the top of FIG. 5. A bipolar transmission rate clock signal which is periodic in nature provides for transmission timing and is required on a BPRZ CLK lead, as illustrated in FIG. 5, to define the transmission rate of the BPRZ signals at the BPRZ transmission port terminals 13 and 14. In a system with an 8 KHz channel repetition frequency, two channels are transmitted in the BPRZ format at about 128 kilobits (Kbs) per second. As before mentioned, frame information is introduced into the BPRZ signal being transmitted by causing periodic violation of the BPRZ format under the control of the signalling frame signal applied at the SBPV lead.

The ULIC is programmable to function in connection with the TDM telephone system or in connection with the telephone user terminal by connecting a lead LC/SS to either a positive voltage or to ground respectively. The ULIC is also programmable to operate with one of two predetermined clock frequencies, both of which are typical in TDM PCM telephone systems. These programmable aspects will be more fully explained later in the description. The remaining leads of the ULIC 100 in FIG. 1A are not connected, and are designated N/C. These leads will not be discussed further with regard to this circuit application of the ULIC 100 in FIG. 1A.

In reference to FIG. 1B, the ULIC 100a is required to generate all the timing and control signals for its own operation and for the operation of an associated telephone user terminal. These timing and control signals are essentially similar to the timing and control signals available at the subscriber line port and are generated in response to the BPRZ signals received at the BPRZ receive signal port in combination with an oscillator derived signal similar in frequency to a whole number multiple of the system first clock signal. The frequency of the derived signal is determined by an appropriate crystal connected to the ULIC at terminals 53 and 54. Regulated power for operation of the ULIC 100a is obtained from the power supply 50 at a +V terminal 51 and a ground terminal 52. The power supply 50 obtains energizing current for its operation from the twisted pair 101 and 102 via the windings 31 and 41 and leads 38 and 48. The leads SELECT, SYSTEM CLK, V/D, PCM CLK, BPRZ CLK and SBPV are all not used and thus are connected to +V. Binary signal information is received from the associated telephone user terminal on all or some of the leads designated IN, and binary signal information is coupled to the telephone user terminal via the leads designated OUT.

All but two of the remaining leads supply signals to the telephone user terminal. Many of these signals are similar to those which would be supplied for the normal operation of a line circuit including any one of the previously listed codecs. The ULIC 100a generates a local clock signal similar to the system first clock signal on an A CLOCK lead. A local second clock signal defining the BPRZ signal bit rate of about 128 KHz is generated on a B CLOCK lead similar to that illustrated in FIG. 5. A 300 Hz signal is generated on a C CLOCK lead. The signal on the A CLOCK lead is used in the operation of the telephone user terminal and the other signals are optionally useful for operation of optionally associated data set circuitry (not shown). A clock signal of about 2 KHz is generated on a SIG CLK lead and defines the periods at which signals may be transmitted and received via the leads SIG IN, A SIGN IN and SIG OUT, A SIG OUT. Control signals on leads PCM SYNC 1 and PCM SYNC are functionally similar to the signal applied to the SELECT lead in the case of FIG. 1A. These signals define the input/output period during which the associated codec communicates with the PCM IN and PCM OUT leads. The signal on the PCM SYNC 1 lead is one bit period long and the signal on the PCM SYNC lead is a byte period long in the operated format of the TDM telephone system and spans a series of eight bit periods. A control signal on a lead DATA SYNC is functionally equivalent to the signal applied at the SELECT lead in the presence of the signal at the V/D lead indicating data. DATA SYNC is intended to indicate to the asociated data circuitry in the telephone user terminal that binary data signals may be exchanged via the leads DATA IN and DATA OUT.

Figure 2:
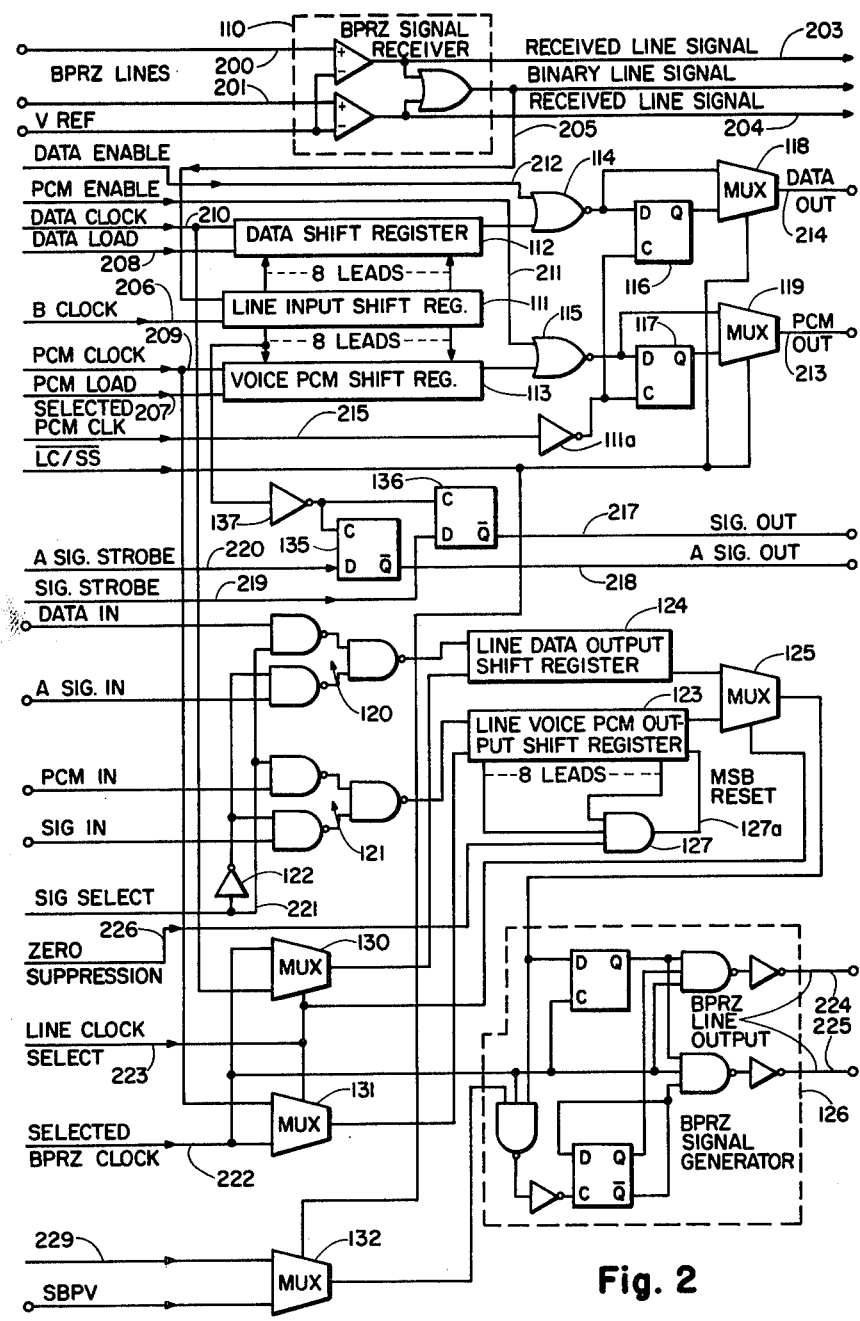
FIG. 2 is a block schematic drawing of signal transfer circuits in a universal interface circuit in FIGS. 1A and 1B.
Figure 3:
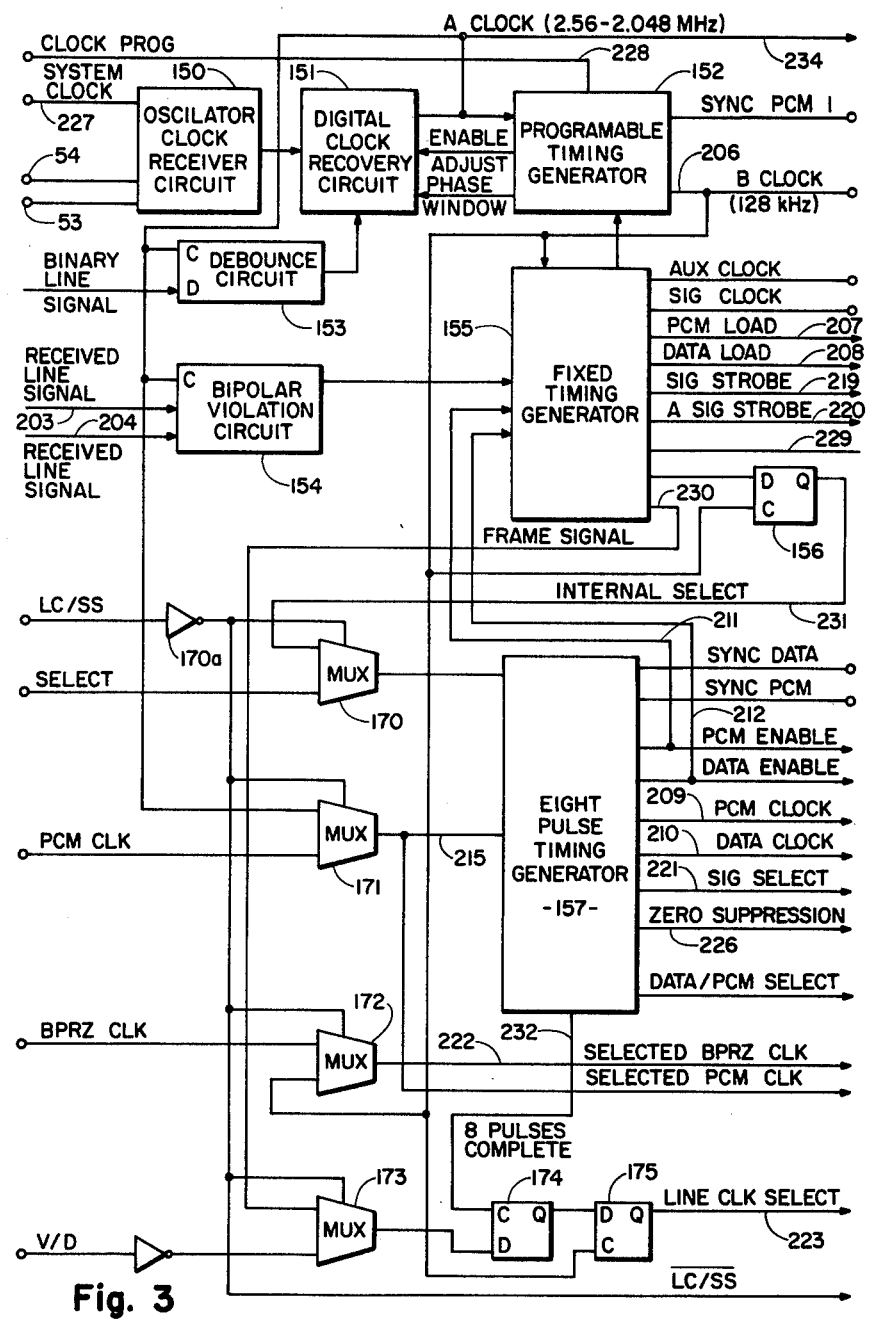
FIG. 3 is a block schematic drawing of timing and control circuits in the universal interface circuit in FIGS. 1A and 1B.
Figure 4:
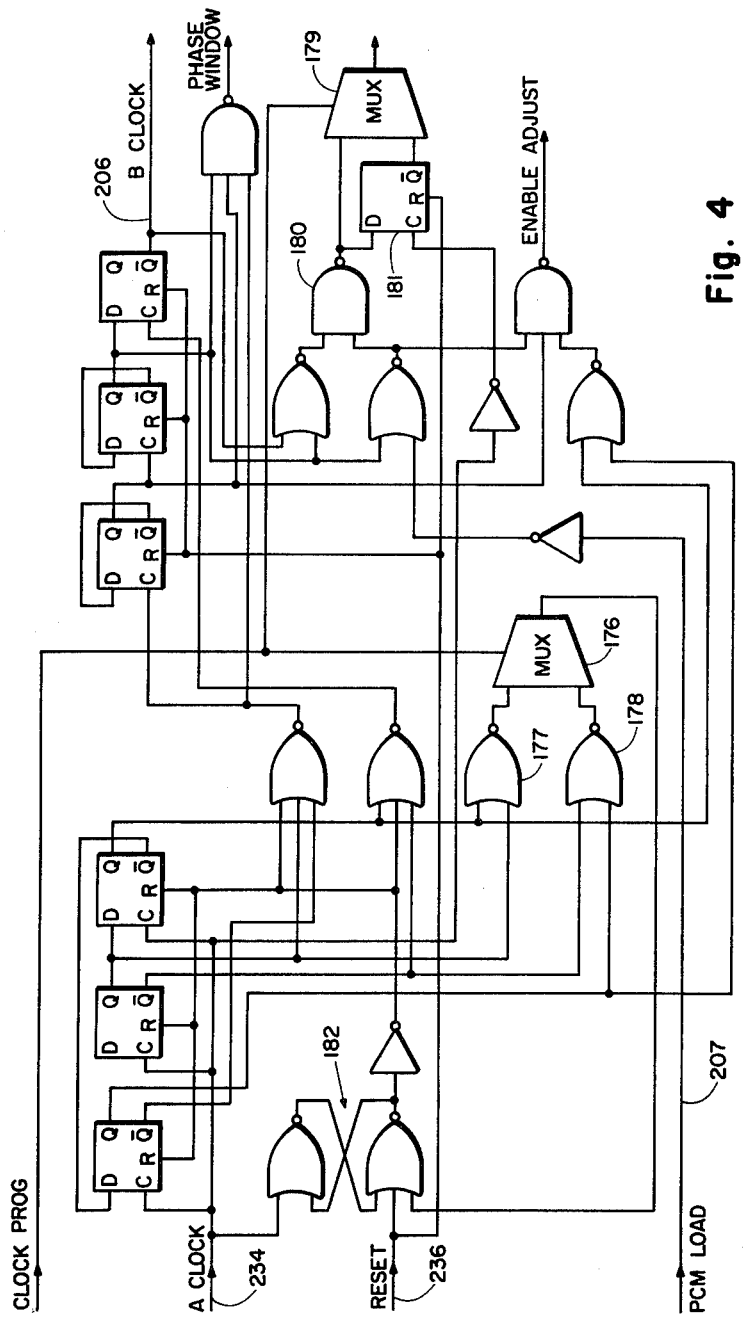
FIG. 4 is a detailed block schematic drawing of one of the timing circuits in FIG. 3.

An example of a ULIC suitable for construction in the form of a monolithic integrated circuit is schematically illustrated in FIGS. 2, 3 and 4. The circuit is described only so far as to illustrate the cooperating functional elements. This description is not intended to be instructive as to the actual device geometry. Neither is it intended to limit the scope of the integrated circuit designer to any particular form of circuit design for providing the ULIC such as would be dictated by any particular species of solid state circuit design such as "bipolar" or "CMOS" for example. In FIGS. 2, 3 and 4, input leads appear on the left of these drawings and output leads appear on the right of these drawings. Those of the leads originating or terminating with a dot, are leads which are externally accesible and correspond to leads in FIG. 1A or FIG. 1B. FIG. 5 taken in conjunction with FIGS. 2 and 3 illustrates some waveforms typical of those appearing on the leads during operation of the circuitry as represented in FIGS. 2 and 3 and have corresponding designations.

The upper half of FIG. 2 illustrates a circuit which receives a bipolar return to zero (BPRZ) signal from a transmission line, via the BPRZ receive port, at a rate sufficient to accommodate up to two 64 Kb/s channels per frame, each optionally including a 2 Kb/s sub channel. The received transmission line signal is registered in binary format and retimed for outputting at predetermined times and rates compatible with the operating format of an associated telephone system or telephone user terminal as the case may be. BPRZ signals are received by a BPRZ signal receiver 110 from BPRZ line inputs 200 and 201 connected to the BPRZ receive port terminals 23 and 24 in FIG. 1A, and 33 or alternatively connected to the BPRZ receive port terminals 34 in FIG. 1B. A reference voltage is received on a reference lead 202 which is connected to the terminal 19 or 49 as the case may be. The reference voltage determines a threshold of response for amplifiers in the BPRZ signal receiver 110. The amplifiers produce receive line signals on leads 203 and 204. Signal assertions on the receive line signal lead 203 correspond to positive portions of the received BPRZ signal and signal assertions on the line signal lead 204 correspond to negative portions of the received BPRZ signal. The logical OR of the two receive line signals on a lead 205 provide a binary line signal representation corresponding to the information content of the received BPRZ signal. The remainder of the upper half of FIG. 2 illustrates converter circuitry for accumulating information bytes from the binary line signal and providing corresponding binary signals at appropriate leads designated OUT, at appropriate times. A line input shift register 111 receives the line signal from the lead 205 in response to BPRZ clock signals from circuitry illustrated in FIG. 3 and appearing on a B CLOCK lead 206. PCM load and data load signals from FIG. 3 appear on leads 207 and 208 respectively, and are illustrated at the bottom of FIG. 5. These signals appear alternately with each occurrence of eight cycles of the BPRZ clock signal. A voice PCM shift register 113 registers the content of the line input shift register 111 with each assertion of the PCM load signal on the lead 207. A data shift register 112 likewise registers the content of the line input shift register with each assertion of the data load signal on the lead 208. PCM and data clock signals each consist of groups of eight clock pulse assertions occurring at a rate corresponding to the PCM bit rate of the associated telephone apparatus. These signals originate in circuitry illustrated in FIG. 3 and appear on a PCM clock lead 209 and a data clock lead 210 respectively. The PCM clock pulse group occurs after the PCM load signal on the lead 207 becomes unasserted. The data clock pulse group occurs after the data load signal on the lead 208 becomes unasserted. The voice PCM shift register 113 responds to the PCM clock signals on the lead 209 by serially shifting its contents to an input of a NOR gate 115. The data shift register 112 responds similarly to data clock signals on the lead 210 by presenting its contents serially at an input of a NOR gate 114. The NOR gates 115 and 114 are each enabled by respective PCM enable and data enable signals appearing on leads 211 and 212, to pass the signals from the respective register to multiplexers 119 and 118 and to D type flip-flops 117 and 116. In the case where the LC/SS lead is at ground potential indicating interface for a telephone user terminal, the output signals from the NOR gates 114 and 115 are delayed one-half of a clock cycle of the PCM clock by the flip-flops 116 and 117 respectively under the control of selected PCM clock signals appearing on a selected PCM clock lead 215. The delayed signals are passed by the respective multiplexers 118 and 119 and appear at the required channel time and in synchronization with the clock rate of the associated telephone user terminal. In the case where the LC/SS lead is at a positive potential indicating interface with a TDM telephone system, the multiplexer 119 or 118 passes the signals directly to the PCM or data outputs 214 and 213 as the case may be.

A signalling bit is derived from PCM information bytes and an auxiliary signalling bit is derived from data information bytes. A signalling output lead 217 and an auxiliary signalling output lead 218 each provide a port at which the least significant bit (LSB) in the line input register 111 becomes available for use in signalling and supervision functions. The LSB is coupled by a buffer 137 to C inputs of D type flip-flops 135 and 136. The flip-flop 135 is responsive to a strobe signal assertion on a lead 219 to transfer the LSB to the lead 217 for use as the signalling bit. The flip-flop 136 is responsive to an auxilliary strobe signal assertion on a lead 220 to transfer the LSB to the lead 218 for use as the auxilliary signalling bit.

The lower half of FIG. 2 illustrates circuitry which receives binary bytes of information from appropriate leads designed IN at a bit rate defined by the data bit rate of the associated TDM telephone system. The circuitry translates up to two selected channels of information into the BPRZ signal format for transmission via the BPRZ transmit port terminals 13 and 14 in FIG. 1A and 43 and 44 in FIG. 1B.

Referring to the lower half of FIG. 2, the DATA IN and A SIG IN leads terminate at a gating circuit generally designated 120. The PCM IN and SIG IN leads terminate at a gating circuit generally designated 121. A signalling select signal originating in circuitry illustrated in FIG. 3 on a lead 221, is coupled directly to the gating circuits 120 and 121 and is also coupled via an inverting buffer 122 to the gating circuits 120 and 121. The gating circuits 120 and 121 permit signal bits at the respective inputs to be presented at the input of a line data output shift register 124 and at the input of a line voice PCM output shift register 123, respectively, for serial loading into same. The registers 124 and 123 are responsive to control signals from a data clock multiplexer 130 and a PCM clock multiplexer 131 respectively, for serial shifting of these signals bits therethrough. The multiplexer 130 is supplied with the data clock signals on the lead 210 and with a selected BPRZ clock signal originating in circuitry illustrated in FIG. 3 on a lead 222. The multiplexer 131 is supplied with the PCM clock signals on the lead 209 and with the selected BPRZ clock signal on the lead 222. The multiplexers 130 and 131 are controlled by a line clock select signal originating in circuitry illustrated in FIG. 3 on a lead 223, such that one of the registers 123 and 124 is operated with the selected BPRZ clock signal while the other register is operated with the PCM or data clock signals supplied to it and vice versa, as the case may be. By this arrangement, one of the registers 123, 124 is operated for a short period of time at a fast rate for loading eight binary information bits while the other of the registers is being operated for a longer period of time at a slower rate for transmitting information bits toward the transmission line and vice versa. The outputs of the register 124 and 123 are multiplex to a common output by a multiplexer 125 which is controlled by the line clock select signal on the lead 223. The output of the multiplexer 125 is used by a BPRZ signal generator 126 in combination with the selected BPRZ clock signal on the lead 222 to generate the BRPZ signals at BPRZ line output leads 224 and 225. These leads are connected to the BPRZ transmit port terminals 13 and 14 in FIG. 1A and 43 and 44 in FIG. 1B. The bipolar violations previously mentioned in relation to the transmission of frame information are generated by the BPRZ signal generator 126 in response to signal assertion at an output of a multiplexer 132. The multiplexer 132 is controlled by the inverted signal state of the LC/SS lead to pass signals from the SBPV lead or from a lead 229 accordingly.

In an operating system wherein $\mu$a 255 signal standard encoded voice signals are coupled between the telephone switching facility and a user terminal, a reduction in crosstalk is achieved by transmitting the complement of the encoded signal in BPRZ signal format to statistically reduce the number of BPRZ signal excursions. The register 123 is arranged to invert binary signals received from the PCM IN lead such that signal excursion in the BPRZ signal represent 'zero' binary bit states in the received binary signal rather than 'one' binary bit states. Likewise, the reverse operation is performed in the voice PCM shift register 113 whereby the $\mu$a 255 signal standard is preserved at the PCM OUT lead 213.

Timing inherent in received BPRZ signals is relied upon for phase control of synchronous operation of the ULICs. Suppression of all 'zero' bytes in the line voice PCM output shift register 123 ensures that sufficient 'ones' are transmitted for synchronization of the receiving ULIC. Each stage of the line voice PCM output shift register 123 is connected to an input of an AND gate 127. The AND gate 127 is enabled, by assertion of a zero suppression signal on a lead 226 to assert its output in the event that all inputs are 'zero'. The zero suppression signal is asserted coincident with the sign bit of a PCM byte, being shifted across from left to right as illustrated in the drawing, into the final stage of the register 123. In the event that all the bits of the PCM byte are 'zeros', the AND gate 127 causes the final stage of the register 123 to be reset to a 'one' via a MSB reset lead 127a. Zero suppression is not needed and is not used in combination with the data output shift register 124. Consequently full data bytes are always available for data transmission unless of course the auxiliary data signalling capability as previously described is utilized.

Furthermore the 'zero' byte suppression in the voice register 123 effects a lower frequency limit in signals transmitted from the BPRZ signal generator 126. The difference between the lower frequency limit and the upper frequency limit of the transmitted BPRZ signal spans about eight octaves, i.e. a minimum of one bit per frame to a maximum of sixteen bits per frame. Signals in this frequency range can be interfaced by conventional transformer hybrid circuits between a 2-wire transmission line and the transmit and receive paths. In cases where physical distance between the ULICs in a digital loop exceeds a few hundred feet, the lesser cost of a 2-wire transmission line as compared to a 4-wire transmission line makes the use of hybrid interface circuits economically advantageous.

The function of the circuitry in FIG. 3 is that of generating internal timing and control signals for the operation of the circuitry in FIG. 2 and in the case of a ULIC connected between the transmission line and a telephone user terminal the function of this circuitry is also that of generating signals that are required for the operation of the telephone user terminal. Circuit elements identified by numerals 150, 151, 152 and 153 function to generate a bit rate clock of either of two frequencies, 2.048 Mhz and 2.56 MHz, on an A clock lead 234 and also generate a rate signal to provide a BPRZ clock at 128 KHz on a B clock lead 206. The circuit element 150 is an oscillator/clock receiver circuit which includes an input connected to a system clock lead 227 which corresponds to the SYSTEM CLK lead of the ULICs. In the FIG. 1A this lead is connected to receive a system clock signal with a frequency of 4.096 MHz or 5.12 MHz. In the FIG. 1B this lead is connected to the positive power supply voltage +V and the oscillator terminals 53 and 54 are connected to a crystal oscillator circuit 55, illustrated in FIG. 1B, which is chosen to oscillate at a frequency corresponding to the frequency of the system clock signal. The oscillator/clock receiver circuit 150 provides a source of local clock signals for the operation of circuit element 151, a digital clock recovery circuit. The digital clock recovery circuit 151 also receives timing signals derived from signals on the binary line signal lead via the circuit element 153, a debounce circuit. The digital clock recovery circuit generates the bit rate clock signal of 2.56 MHz or 2.048 MHz on the A clock lead 234, depending upon which of the previously listed codecs is used in the associated telephone user terminal. The circuit element 152 is a timing generator which is programmable by binary state of a clock program lead 228 to operate with either of the previously mentioned bit rate clock signal frequencies. The programmable timing generator 152 generates the 128 KHz clock signal on the B clock lead 206, and also generates a phase window signal and an enable adjust signal for precision phase control of the digital clock recovery circuit 151. An enable signal for use by a codec in an associated telephone user terminal is also generated on a PCM SYNC 1 lead. The enable signal coincides with every eighth occurrence of a pulse of the 2.048 MHz bit rate clock signal or with every tenth occurrence of a pulse of the 2.56 MHz bit rate signal. A more detailed description of the programmable timing generator 152 is given later in conjunction with FIG. 4. One example and detailed description of a digital clock recovery circuit and debounce circuit suitable for use in the ULIC is that disclosed by Alberto Boleda and John Francis Wakerly in U.S. Pat. No. 4,216,544, issued on Aug. 5, 1980 and entitled "Digital Clock Recovery Circuit".

Frame timing corresponding to that of the operating format of the TDM telephone system is communicated between the ULICs by timed violations of the BPRZ signals being transmitted. A bipolar violation circuit 154 receives the signals on the leads 203 and 204 and under the control of the bit rate clock signal on the A clock lead 234 generates a bipolar violation indication with each occurrence of a violation of the bipolar signal format in the serial BPRZ signals received by the ULIC. The bipolar violation indicates system frame intervals and is used for the operation of a fixed timing generator 155. The fixed timing generator is driven by the 128 KHz clock signal on the lead 206 to generate the following timing and control signals: an auxiliary clock signal at a frequency of 300 Hz on the C CLOCK lead; a signalling clock occurring on the SIG CLOCK lead with each fourth frame occurrence; an auxiliary signalling clock signal occurring on the A SIG CLOCK lead with each fourth frame occurrence; a signalling strobe occurring on the signalling strobe lead 219, coincident with the signalling clock signal on the SIG CLOCK lead and the least significant bit of PCM signal on the PCM IN lead; an auxiliary signalling strobe on the auxiliary signalling strobe lead 220, the auxiliary signalling strobe being coincident with the auxiliary clock signal on the A SIG CLOCK lead and the least significant bit of data signal on the DATA IN lead; the PCM load signal on the lead 207 and occurring during the first half of a frame and persisting to but not beyond the end of the first half of the frame; the data load signal occurring on the lead 208 and occurring during the last half of a frame and persisting to but not beyond the end of the last half of the frame; an internal select signal occurring at the beginning of each half of the frame and applied at a D input of a D type flip-flop 156; a frame signal occurring on a frame signal lead 230 and defining the first and last half portions of each frame occurrence; and a bipolar violation enable signal occurring on the lead 229. The above signals are generated by circuitry in the fixed timing generator 155 which includes a counter and decoding logic (not shown) for this purpose. The fixed timing generator 155 is primarily responsive to the BPRZ clock signal on the B clock lead 206 for its operation. It is reset in response to the bipolar violation indication signal from the bipolar violation circuit 154. It is also responsive to the signals on PCM enable and data enable leads 211 and 212 for its operation in the generation of the signalling strobe and the auxillary signalling strobe.

An eight pulse generator 157 provides control signals including eight pulse bursts of synchronizing and clock signals for both internal and external use. The control signals are generated in response to a clock signal on the selected PCM CLK lead 215 and a start signal. The pulse repetition frequency in each eight pulse burst corresponds to the frequency of the clock signal on the lead 215. The clock signal on the selected PCM CLK lead 215 in FIG. 3 is selected by a multiplexer 171 from one of two sources, a PCM CLK lead corresponding to the PCM CLK lead in FIG. 1A or the A clock lead 234. The start signal is selected by a multiplexer 170 from one of two sources, a SELECT lead corresponding to the SELECT lead in FIG. 1A, or an internal select lead 231 originating at a Q output of the flip-flop 156. Both the multiplexers 170 and 171 are responsive to the signal state of an LC/SS lead corresponding to the LC/SS lead in FIGS. 1A and 1B. The signal state of the LC/SS lead is coupled to control the multiplexer 170 and 171 and multiplexers 172 and 173 via an inverting buffer amplifier 170a. A positive voltage applied to the LC/SS lead indicates operation adjacent a TDM telephone system and causes the multiplexers 170 and 171 to pass signals from the external input SELECT and PCM CLK leads respectively. Alternately a ground potential at the LC/SS lead indicates operation adjacent a telephone user terminal and causes the multiplexers 170 and 171 to pass signals from the leads 231 and 234 respectively. The eight pulse generator 157 responds to an assertion of the start signal at the output of the aultiplexer 170 by generating a burst of eight clock pulses on the PCM CLOCK lead 209, and by generating a pulse coincident with the period of the burst at which time a signal is also on the PCM enable lead 211. An example of a waveform which represents the signal on the PCM clock lead 209 is illustrated in FIG. 5. These signals cause the information content of the voice PCM shift register 113 in FIG. 2 to be serially transmitted. When the signal at the output of the multiplexer 170 becomes unasserted, the eight pulse generator responds by generating eight clock pulses on the data clock lead 210, during which time a signal is also asserted on the data enable lead 212. These signals cause the information content of the data shift register 112 in FIG. 2 to be serially transmitted. As before mentioned the eight clock pulses on the data clock and PCM clock leads 210 and 209 are also used to cause the registers 124 and 123 in FIG. 2 to respectively serially accept information signals. The signalling select signal on the lead 221 originates at the eight pulse generator 157. This signal is asserted coincident with the time of the least significant bit occurrences on the DATA IN and PCM IN leads during every fourth frame occurrence. The zero suppression signal on the lead 226 originates at the eight pulse generator. This signal is asserted during the last half of the eighth clock pulse on the PCM clock lead 209, to enable zero code suppression by the AND gate 127, as previously described in relation to FIG. 2. The multiplexer 172 is controlled by the signal state of the LC/SS lead to select between system BPRZ clock signals on the BPRZ CLK lead and the 128 KHz BPRZ signal on the B clock lead 206 to provide a selected BPRZ CLK signal on the lead 222. A multiplexer 173 is also controlled by the signal state of the LC/SS lead to select between the signal on the V/D lead, being inverted by an amplifier 173a and the internally generated frame signal on the lead 230. An output of the multiplexer 173 is connected to a D input of a flip-flop 174. The eight pulse generator generates a signal on an 8 pulses complete lead 232 during the bit period following the eight pulses of the PCM or data clock signals on the leads 209 and 210. The signal on the 8 pulses complete lead causes the flip-flop 174 to be set to the state of the output of the multiplexer 173. The state of the flip-flop 174 is clocked into a flip-flop 175 by the BPRZ clock signal on the B clock lead 206, providing the line clock select signal on the line clock select lead 223 for use as previously described by the multiplexers 125, 130 and 131 in FIG. 2.

FIG. 4 illustrates one example of circuitry suitable for providing timing generator functions, and particularly those functions described in relation to the programable timing generator 152 in FIG. 3. As the basic principles of operation of the circuitry in FIG. 4 are generally self-evident, only that circuitry which provides those features which are peculiar to the timing generator 152 will be discussed in detail. The basic function of programable timing generator 152 is that of generating the BPRZ 128KHz clock signal on the B clock lead 206 by dividing the bit rate clock signal received from the A clock lead 234. To this end, six D type flip-flops shown at the top of the drawing are connected with associated gates to provide a Johnson type counter circuit. In this example the generator 152 is required to operate from a 2.56 MHz clock signal or a 2.048 MHz clock signal present on the A clock lead 234. For this purpose, reset signals from NOR gates 177 and 178 are selected by a multiplexer 176 as directed by the signal state of the CLOCK PROG lead. The selected reset signal is applied to a reset flip-flop circuit, generally indicated at 182, for controlling the operation of the Johnson counter. The reset circuitry at 182 is also responsive to a reset signal generally distributed throughout the ULIC on a lead 236 otherwise not shown. As is commonly practiced in digital circuitry, the reset signal is generated soon after an initial application of energizing power to the ULIC to reset it to a predetermined state from which orderly circuit functions proceed. When the CLOCK PROG lead is connected to a ground potential, the programmable timing generator 152 divides a 2.048 MHz signal on the lead 234 by sixteen to provide the 128 KHz BPRZ clock signal on the B clock lead 206. In the case of a 2.56 MHz signal on the lead 234 the CLOCK PROG lead must be connected to a positive potential +V. In this case the programmable timing generator accordingly devides the signal on the lead 234 by 20 to generate the 128 KHz clock BPRZ signal on the B clock lead 206.

The programmable timing generator also includes a multiplexer 179 for selectively adjusting timing of the signal on the PCM SYNC 1 lead, so that the timing of this signal is compatible with the operating requirements of the previously listed codecs useable in the associated telephone user terminal. This signal is selected by the multiplexer 179 either directly from an output of a NAND gate 180, when the CLOCK PROG lead is connected to the ground potential, or from a D type flip-flop 181 which delays the signal by about one-half of the PCM clock period, when the CLOCK PROG lead is connected to the positive potential +V.

What is claimed is:

1. A telephone system having a time division multiplex (TDM) facility with subscriber ports, for connection with remote telephone user terminals via associated single channel codecs, each single channel codec being for receiving analog signals from an associated one of the telephone user terminals, for coupling corresponding digital signals in an operating signal format of the TDM facility to an associated subscriber port, for accepting digital signals in the operating signal format of the TDM facility from the associated subscriber port, and for transmitting corresponding analog signals to the user telephone terminal the telephone system being characterized by:

digital signal transmit and receive paths terminated at line interface units, the line interface units being for interfacing digital signals in an operating format of the transmit and receive paths with the operating format of the codec and the TDM facility, each line interface unit including;

a store and forward circuit for accepting digital signal information bytes corresponding to two channels of information bytes per frame in the operating format of the TDM switching facility in response to select signals and input timing signals, and for transmitting signals corresponding to the accepted information bytes via one of the paths and at a bit rate having a maximum corresponding to twice the average single channel bit rate in the operating format of the TDM switching system in response to a periodic transmission timing signal;

an accumulate and forward circuit for accepting and accumulating information bytes bit by bit from one of the transmit and receive paths in response to a periodic acceptance timing signal, and for outputting accumulated information bytes in the operating format of the TDM facility in response to output timing signals;

timing circuitry, being alternately programmable;

(a) to be responsive to select signals and periodic system timing signals from the TDM facility for generating the input timing signals, the periodic transmission timing signal and the output timing signals, and to be responsive to signal transitions in signals from the transmit path for generating the periodic acceptance timing signal, or (b) to be responsive to signal transitions in signals from the receive path and periodic timing signals from a local clock source for generating the select signal, the input timing signal, the periodic transmission timing signal, the output timing signal and the periodic acceptance timing signal.

2. In a TDM PCM telephone system having an operating signal format of n channels per frame each channel having m bits, and a plurality of subscriber ports each connected with a single channel codec for coupling information signals between a remote telephone user terminal and the TDM PCM telephone system via an analog subscriber loop circuit, an improvement characterized by:

a digital subscriber loop circuit substituted for said analog subscriber loop circuit, the digital subscriber loop circuit comprising:

a transmission line having transmit and receive signal paths for coupling information signals between the subscriber port and the single channel codec in a signal format consisting of a constant bit rate of at least m bits per frame;

terminal means associated with said transmit and receive signal paths for coupling a source of energizing power to the remote telephone user terminal via conductors in the transmit and receive signal paths;

a universal interface circuit having transmission line terminals for transmitting and receiving the information signals via the transmission line, and having a plurality of digital signal terminals, in one case selectably connectable with the subscriber line port to simulate the operating signal characteristics of the single channel codec, and in another case selectably connectable with the single channel codec to simulate the operating signal characteristics of the subscriber line port;

whereby the single channel codec is in the remote location of the telephone user terminal.

3. A line interface circuit for interfacing opposite ends of a transmission line with a time division multiplex (TDM) telephone system and with a communication terminal respectively, the TDM telephone system being operable in a first signal format with which the communication terminal is compatible, the first signal format including frames of n TDM channels, each channel consisting of a byte of m bits, the transmission line being operable in a second signal format limited to an upper frequency of less than the bit repetition frequency of the first signal format the line interface unit comprising:

a digital signal port having input and output terminals, in a first case for connection to the TDM telephone system and in a second case for connection to the communication terminal;

a transmission line port having input and output terminals for connection to the transmission line;

a first converter circuit connected between the input terminals of the digital signal port and the output terminals of the transmission line port, for converting at least one channel of information signals in the first signal format to corresponding signals in the second signal format for transmission along the transmission line, in response to a plurality of first control signals;

a receiver circuit connected to the input terminals of the transmission line port, for receiving signals in the second signal format;

a second converter circuit connected between the receiver circuit and the output terminals of the digital signal port, for converting select portions of the received signals to corresponding bytes in the first signal format, in response to a plurality of second control signals;

means for generating said plurality of first control signals and said plurality of second control signals, in the first case in combined response to select signals and input timing signals from the TDM telephone system and predetermined characteristics in signals received by the receiver circuit, and in a second case in response to a locally generated clock signal and predetermined characteristics in signals received by the receiver circuit;

whereby information signals in at least one channel in the first signal format and appearing at the digital signal port input terminals are converted to information signals in the second signal format for transmission along the transmission line via the transmission line port output terminals, and information signals in the second signal format and appearing at the transmission line port input terminals are converted to information signals in the first signal format in at least one of said TDM channels for coupling to the TDM telephone system via the digital signal port output terminals.

4. A universal line interface circuit (ULIC) for use in a digital subscriber loop circuit including a transmission line for carrying coded signals between a TDM PCM telephone system and a remotely located binary signal input/output device, said binary signal input/output device being substantially compatible with an operating signal format of the TDM PCM telephone facility, and said transmission line having a useable upper frequency operating limit consistent with accommodating bipolar return to zero coded signals corresponding to 2m information bit occurrences per frame period in the operating signal format of the TDM PCM telephone facility, the ULIC comprising:

a first signal converter for accepting binary communication signals corresponding to a repetitive channel occurrence of m bits in the TDM operating signal format and converting said binary communication signals to coded signals with an information bit rate in the range of m and 2m bits per frame period in the TDM operating signal format, for transmission on said transmission line, in response to timing control signals;

a second signal converter for accepting coded signals from the transmission line and converting said coded signals to binary communication signals corresponding to a repetitive channel of m bits in the TDM operating signal format, in one case for receipt by the TDM PCM telephone facility and in another case for use by said binary signal input-/output device, in response to the timing control signals;

timing and control means responsive in operation to a preselected binary program signal for selecting one of two groups of timing and control functions, the ULIC in one case being operable to provide for coupling between the TDM PCM telephone facility and the transmission line, and in the other case being operable to provide for coupling between the transmission line and the binary signal input/output device;

in the one case, the timing and control means being responsive to system timing signals and a system select signal for generating the timing control signals for operation of said first signal converter and in addition being responsive to coded signals accepted by the second signal converter for generating the timing control signals for operation of the second signal converter;

in the other case, the timing and control means being responsive to a locally generated clock signal having a frequency similar to a frequency of the system timing signals and to coded signals accepted by the second converter for generating the timing control signals for operation of the first converter, the timing control signals for operation of the second converter, and for generating clock and select signals equivalent to the system timing and select signals for operation of the binary signal input/output device.

5. A universal line interface circuit (ULIC) for coupling information signals between a TDM PCM telephone facility, operable in a binary signal format consisting of m bits per frame in a serial bit stream and a remotely located binary signal input/output device compatible in operation with a multichannel operating signal format, said coupling being via a transmission line with transmit and receive paths spanning a distance between near and remote ends, each end being terminated by a ULIC, said transmit and receive paths being for carrying coded signals corresponding to binary information signals and consisting substantially of alternating current, the ULIC comprising:

a digital input port for coupling a serial bit stream to the ULIC;

a digital output port coupling a serial bit stream from the ULIC;

a transmission input port for receiving the coded signals from the transmission line;

a transmission output port for transmitting the coded signals to the transmission line;

a first input port for receiving a system first clock signal having a pulse frequency of n m pulses per frame;

a second input port for receiving a system second clock signal having a predetermined average pulse frequency in a range of m and 2m pulses per frame and being in syncronization with the system first clock pulses;

a select input port for receiving a system select signal for indicating a selected channel occurrence;

a location input port for receiving a program signal for selecting functions of the ULIC as being required for interface between the telephone facility and the transmission line or alternately as being required for interface between the remote binary signal input/output device and the transmission line;

a first output port for providing a local clock signal from the ULIC;

a second output port for providing a select signal from the ULIC, for indicating a selected channel occurrence;

a first signal converter for converting bytes of binary signals of a predetermined bit rate per byte, to corresponding coded signals of a lower information bit rate for transmission on the transmission line, in response to a byte clock signal and a second clock signal wherein said bytes are resident in a selected channel in said serial bit stream having n m bit positions per frame period and said coded signals having an information bit rate in a range of m and 2m bit positions per frame period as defined by the second clock signal;

a second signal converter for converting coded signals appearing at the transmission input port to binary signals, and in response to the second clock signal and a local byte clock signal for generating serial bytes of said binary signals at the digital output port and having a byte bit rate corresponding to a rate of n m bits per frame period, and a timing and control system comprising:

a timing input port for receiving a timing signal having a frequency similar to a whole number multiple of the frequency of the system first clock signal;

clock recovery means responsive to the timing signal received at the timing input port and to said coded signals as received by the second signal converter, for generating said local first clock signal;

a first timing generator responsive to said local first clock signal for generating a local second clock signal;

a first clock selection means for selecting one of, the system first clock signal and the local first clock signal to yield said first clock signal in response to the binary signal state of the program signal;

a second clock selection means for selecting one of the system second clock signal and the local second clock signal to yield said second clock signal in response to the binary signal state of the program signal;

a second timing generator for generating a local frame signal having a period corresponding to said frame period in response to the local second clock signal and syncronized with frame indications in said coded signal appearing at the transmission input port and for generating a local select signal with half the period of the local frame signal and syncronized therewith;

a third timing generator for generating the byte signal in response to the program signal and the first clock signal, and in the case where the program signal is of one binary state in response to the system select signal and in the case where the program signal is of the other binary state in response to the local select signal, wherein the byte signal consists of m clock pulses substantially coincident with the clock pulses of the first clock signal, commencing with an assertion of the system select signal or the local select signal, as the case may be;

whereby the timing and control system generates signals for controlling the second signal converter in the case where the state of the program signal indicates the ULIC to be terminating said near end of the transmission line, and generates signals for controlling both the first and second signal converters in the case where the state of the program signal indicates the ULIC to be terminating said distant end of the transmission line.

* * * * *